(12) United States Patent
Droste et al.

(10) Patent No.: US 9,716,758 B2
(45) Date of Patent: Jul. 25, 2017

(54) NETWORK-COORDINATED DRX TRANSMISSION REDUCTION FOR A NETWORK ACCESS DEVICE OF A TELEMATICS-EQUIPPED VEHICLE

(71) Applicant: GENERAL MOTORS LLC, Detroit, MI (US)

(72) Inventors: Scott T Droste, Ferndale, MI (US); Vishnu Chikondla, Troy, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 360 days.

(21) Appl. No.: 14/512,559

(22) Filed: Oct. 13, 2014

(65) Prior Publication Data

US 2016/0105365 A1    Apr. 14, 2016

(51) Int. Cl.
| H04L 29/08 | (2006.01) |
| G07C 5/00 | (2006.01) |
| H04W 4/02 | (2009.01) |

(52) U.S. Cl.
CPC ............. H04L 67/12 (2013.01); G07C 5/008 (2013.01); *H04W 4/028* (2013.01)

(58) Field of Classification Search
None
See application file for complete search history.

(56) References Cited

U.S. PATENT DOCUMENTS

| 2004/0142659 A1* | 7/2004 | Oesterling | G07C 5/085 455/11.1 |
| 2004/0203692 A1* | 10/2004 | Schwinke | G07C 5/008 455/419 |
| 2009/0088910 A1* | 4/2009 | Yi | H04L 12/12 701/1 |
| 2011/0128915 A1* | 6/2011 | Wang | H04W 76/062 370/328 |
| 2012/0039313 A1* | 2/2012 | Jain | H04B 17/318 370/338 |
| 2012/0214502 A1* | 8/2012 | Qiang | H04W 8/12 455/453 |
| 2013/0301501 A1* | 11/2013 | Olvera-Hernandez | H04W 76/048 370/311 |

(Continued)

FOREIGN PATENT DOCUMENTS

CN    WO 2014110771 A1 *  7/2014    .......... H04W 68/005

*Primary Examiner* — Faruk Hamza
*Assistant Examiner* — Cassandra Decker
(74) *Attorney, Agent, or Firm* — Leydig, Voit & Mayer, Ltd.

(57) ABSTRACT

A system for reduction of discontinuous-receive (DRx) transmissions for a network access device (NAD) of a telematics unit of a telematics-equipped vehicle includes: the telematics unit, configured to determine whether vehicle ignition of the telematics-equipped vehicle is on or off, the telematics unit further comprising the NAD, the NAD being configured to communicate with a network entity to perform a periodic updating procedure; the network entity, configured to communicate with the NAD for performance of the periodic updating procedure. The NAD and the network entity are further configured to reduce a frequency at which the periodic updating procedure is performed for the NAD in a DRx state relative to the frequency at which the periodic updating procedure is performed for the NAD in a vehicle ignition-on state.

9 Claims, 5 Drawing Sheets

(56) References Cited

U.S. PATENT DOCUMENTS

| | | | | |
|---|---|---|---|---|
| 2014/0321343 A1* | 10/2014 | Gupta | ............... | H04W 36/0066 370/311 |
| 2014/0321365 A1* | 10/2014 | Shoji | ..................... | H04W 60/06 370/328 |
| 2015/0319734 A1* | 11/2015 | Zhang | ................ | H04W 68/005 455/458 |

* cited by examiner

NETWORK-COORDINATED DRX TRANSMISSION REDUCTION FOR A NETWORK ACCESS DEVICE OF A TELEMATICS-EQUIPPED VEHICLE

FIELD

The present disclosure relates generally to vehicle telematics systems and more particularly to reducing the amount of transmissions made by a network access device (NAD) of a telematics-equipped vehicle while in a discontinuous-reception (DRx) state.

BACKGROUND

Telematics units within telematics-equipped mobile vehicles provide telematics subscribers with connectivity to a telematics service provider (TSP). The TSP provides telematics subscribers with an array of services ranging from emergency call handling and stolen vehicle recovery to diagnostics monitoring, global navigation system-aided position identification, map services, and turn-by-turn navigation assistance. Telematics units are often provisioned and activated at a point of sale when a telematics subscriber purchases a telematics-equipped vehicle. Upon activation, the telematics unit can be utilized to provide a telematics subscriber with telematics services such as those described herein.

When the ignition of the mobile vehicle is off, a network access device (NAD) of a mobile vehicle's telematics unit can be placed into a discontinuous-reception (DRx) state, where the NAD goes through DRx cycles including periods of availability and unavailability for wireless communications. Placing the NAD into the DRx state while the mobile vehicle ignition is off helps to minimize power drain on the vehicle battery while still preserving the NAD's ability to communicate and carry out commands from the telematics subscriber, the TSP, and/or a wireless network provider.

Thus, while the NAD is in a DRx state, service requests—such as maintenance and diagnostic functions, system updates, vehicle position determination, unlocking of the doors, or vehicle alarm silencing—may be sent to the telematics unit during the portion of a DRx cycle where the NAD is on, and the telematics unit interacts with other respective vehicle hardware components to carry out the requested service. However, because DRx cycles are still consuming power, after a certain amount of time or once the vehicle's battery charge level drops below a certain threshold, the NAD may end the DRx period and switch to an off state where the NAD is unavailable to facilitate communications with the telematics unit and other vehicle hardware.

The above body of information is provided for the convenience of the reader. The foregoing describes a suitable environment for which the described system and method are provided, and is not an attempt to review or catalog the prior art.

SUMMARY

In an exemplary implementation, the invention provides a system for reduction of discontinuous-receive (DRx) transmissions for a network access device (NAD) of a telematics unit of a telematics-equipped vehicle. The system includes: the telematics unit, configured to determine whether vehicle ignition of the telematics-equipped vehicle is on or off, the telematics unit further comprising the NAD, the NAD being configured to communicate with a network entity to perform a periodic updating procedure; and the network entity, configured to communicate with the NAD for performance of the periodic updating procedure. The NAD and the network entity are further configured to reduce a frequency at which the periodic updating procedure is performed for the NAD in a DRx state relative to the frequency at which the periodic updating procedure is performed for the NAD in a vehicle ignition-on state.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
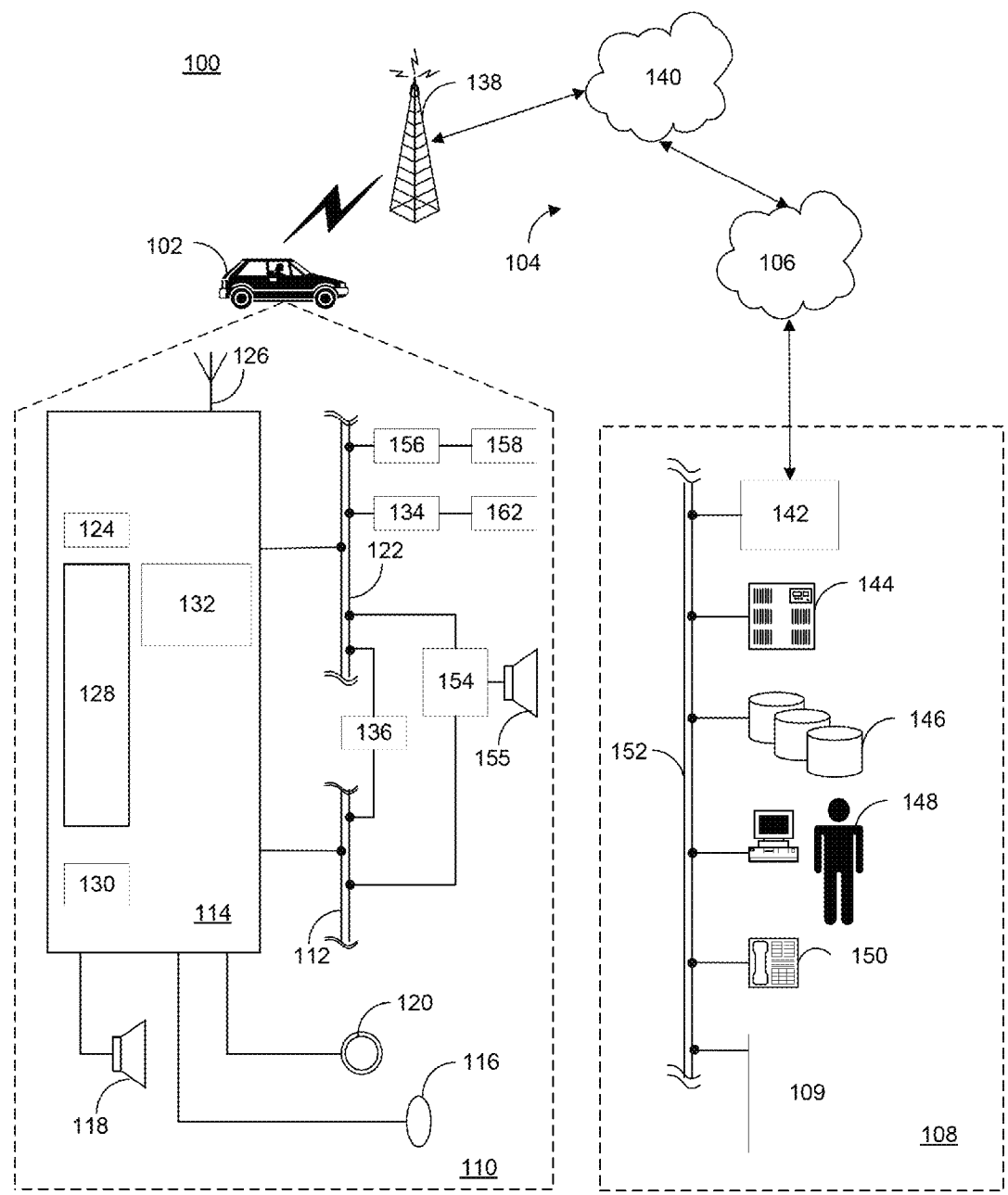
FIG. 1 is a schematic diagram of an operating environment for a mobile vehicle communication system usable in implementations of the described principles.

An exemplary computing and network communications environment is described hereinafter with reference to FIG. 1. It will be appreciated that the described environment is an example, and does not imply any limitation regarding the use of other environments to practice the invention. FIG. 1 illustrates an example of a communication system 100 that may be used with the invention and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108 (or "call center"). The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114. These services may also be provided via the communications center 108 in combination with applications executed on a mobile device, such as a smartphone, or, alternatively, via communications between the telematics unit 114 and a mobile device that do not involve the communications center 108.

The telematics unit 114 provides, for users, an extensive and extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. For example, other services include but are not limited to: vehicle door unlocking, diagnostic monitoring, firmware/software updating, emergency or theft-related services, etc. Moreover, the telematics unit 114 may include a number of known components in addition to those explicitly described above.

Vehicle communications may use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a way to input verbal or other auditory commands, and can be equipped with an embedded voice processing unit utilizing human/machine interface (HMI) technology. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSCs 140 may include remote data servers.

As appreciated by those skilled in the art, the mobile wireless network system includes various cell tower/base station/MSC arrangements. For example, a base station and a cell tower could be located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions and/or applications installed on the telematics unit, and operations performed at the communications center or other entities may be carried out according to stored instructions and/or applications installed at the communications center.

Exemplary implementations of the invention, which will be described in further detail below with reference to certain elements of the exemplary environment 100 of FIG. 1, provide for network-coordinated reduction in DRx transmissions for the NAD of a telematics unit of a telematics-equipped vehicle.

In a conventional system, the NAD of a telematics unit enters its DRx state autonomously—i.e., without providing any notification to a wireless network serving the NAD. The serving wireless network and the NAD thus continue to engage in certain periodic update procedures, such as periodic location-related updates, even though such periodic requests are highly likely to result in redundant processing and message transmissions by the NAD (e.g., since the vehicle ignition is off while the NAD is in the DRx state, the vehicle corresponding to the NAD will not change locations, which generally renders periodic location-related updates unnecessary). The NAD consumes power while formulating a message for transmission (processing power), transmitting the message (transmitter power), and receiving and processing responses from the serving wireless network (receiver and processing power), and, for example, when the NAD is allocated a DRx power consumption budget, these operations use up that budget and shorten the amount of time in which the NAD may remain in the DRx state before transitioning to an off state.

Implementations of the invention are able to avoid the consumption of power associated with such periodic requests from the serving wireless network by utilizing signaling procedures between the NAD and the serving wireless network to coordinate the operation of the NAD with the serving wireless network, such that transmissions from the NAD to the serving wireless network while the NAD is in the DRx state are reduced or limited so as to avoid unnecessary consumption of power.

Figure 2:
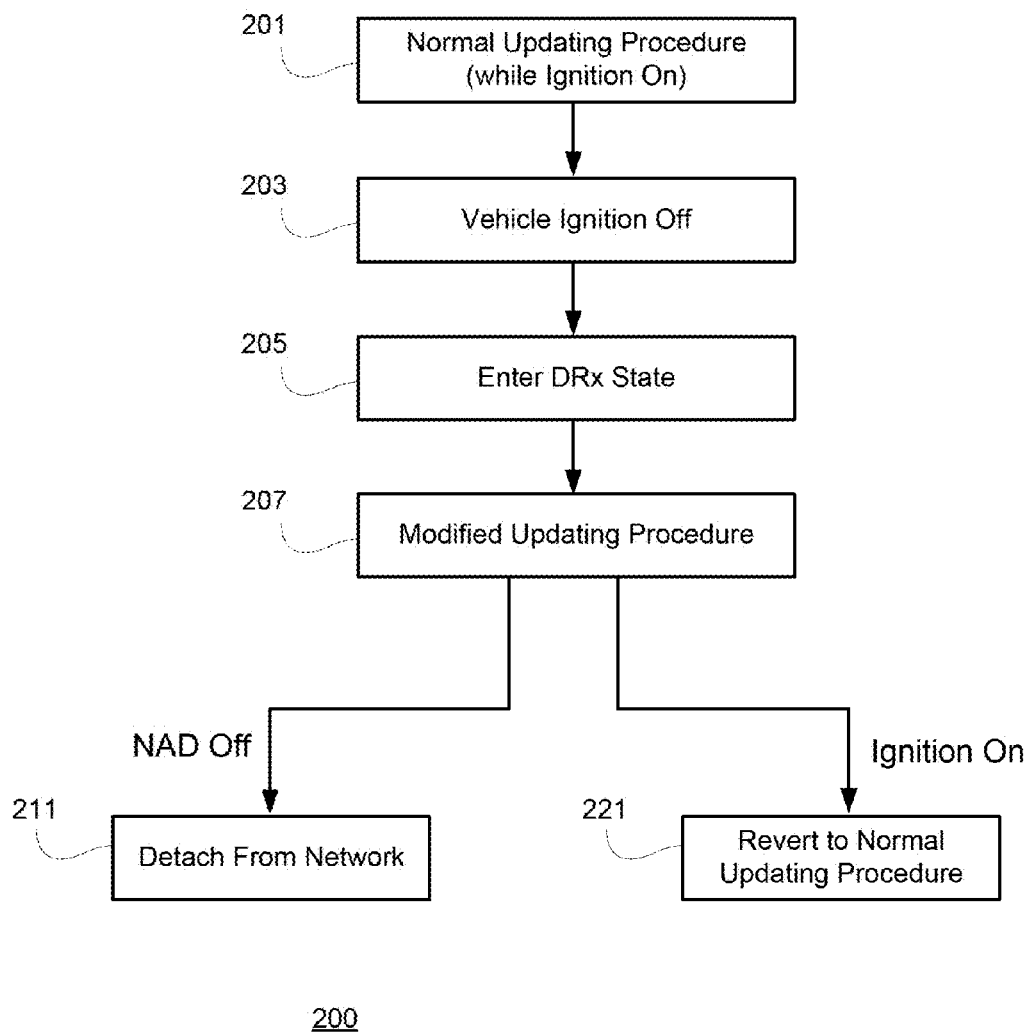
FIG. 2 is a flowchart illustrating an exemplary process for performing a network-coordinated reduction in DRx transmissions with respect to a network access device (NAD) of a telematics unit of a telematics-equipped vehicle.

FIG. 2 is a flowchart 200 illustrating an exemplary process for the NAD of a telematics unit to reduce the number of transmissions that will be performed by the NAD while in a DRx state. Stage 201 corresponds to the vehicle being in an ignition-on state with a first, "normal" (or default) updating procedure being executed by the NAD and the wireless network serving the NAD where, for example, the NAD provides location area, routing area, or tracking area updates at a certain periodic interval. At stage 203, the vehicle ignition is turned off, and at stage 205, sometime after the vehicle ignition is turned off and/or in response to the vehicle ignition being turned off, the NAD enters the DRx state. When the NAD of the vehicle enters the DRx state at stage 205, it also sends information to the serving wireless network that allows the serving wireless network to determine that the NAD has entered the DRx state (and thus will be unlikely to move from its location), and the serving wireless network modifies the periodic updating procedure so as to execute a modified periodic updating procedure at stage 207 with respect to the NAD (e.g., by sending an updated timer value to the NAD to increase the time between updates). The modified periodic updating procedure used in stage 207 reduces the frequency of periodic updating for the NAD (including, in an example, eliminating the requirement for the NAD to provide certain updates), such that the NAD consumes less power while operating in the DRx state.

In the event that the NAD transitions to the off state (such as when the NAD has exhausted its power allocation or when a certain amount of time in the DRx state has elapsed), the NAD then detaches from the serving wireless network at stage 211. On the other hand, in the event that the vehicle ignition is turned on, the serving wireless network and the NAD revert to the normal periodic updating procedures used in stage 201 (e.g., performing the updating procedure at a normal or default interval).

Figure 3:
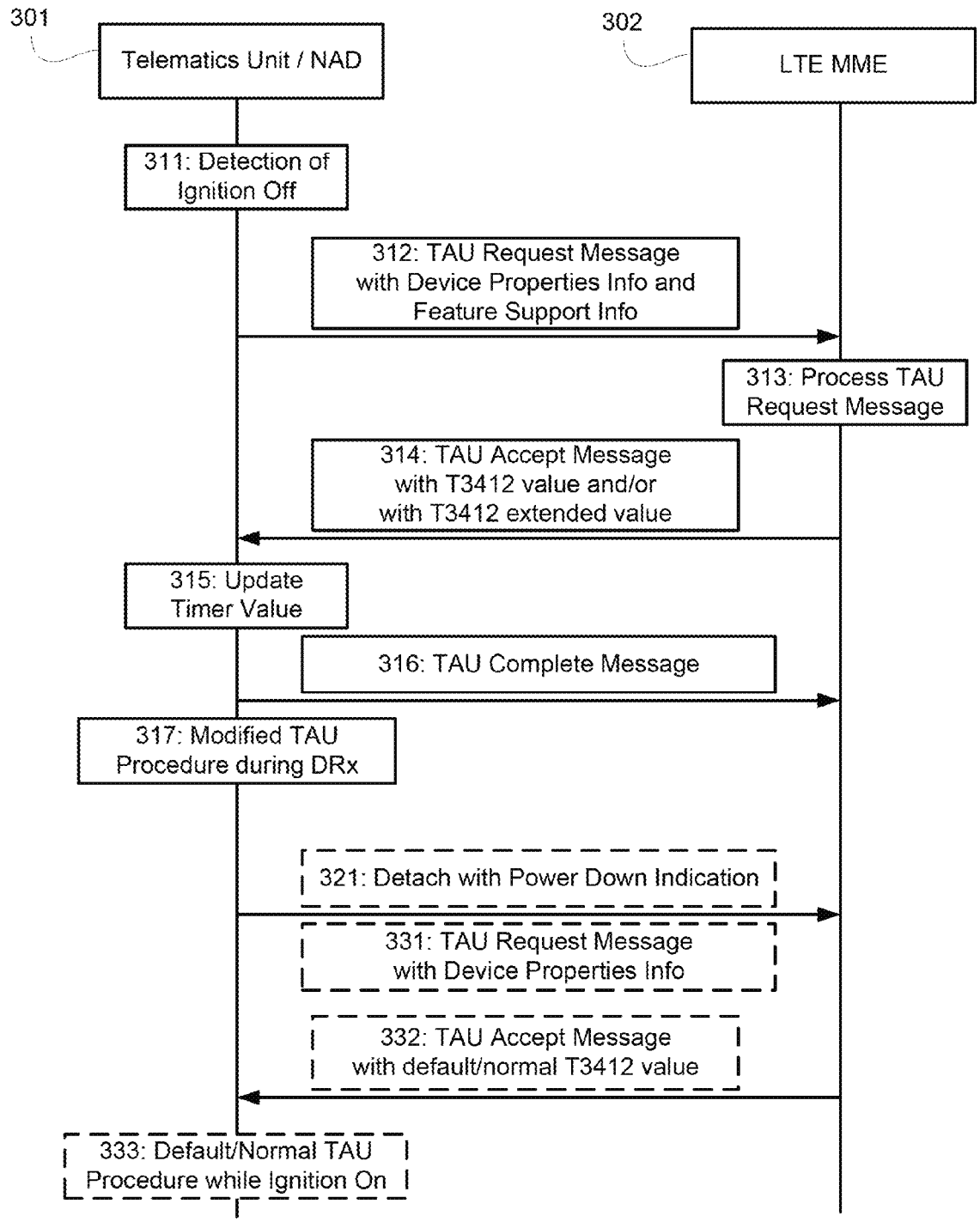
FIG. 3 is a flowchart illustrating communications between a NAD and a mobility management entity (MME) in a particular exemplary environment.

FIG. 3 is a flowchart 300 illustrating the principles of FIG. 2 in further detail within a particular exemplary context where the serving wireless network a Long Term Evolution (LTE) network utilizing a $3^{rd}$ Generation Partnership Project (3GPP) signaling standard (e.g., according to 3GPP TS 24.008, 3GPP TS 24.301, and 3GPP TS 24.312) for machine-type communications (MTC) or machine-to-machine communications (M2M), with the telematics unit (which includes the NAD) 301 communicating with an LTE Mobility Management Entity (MME) 302. At stage 311, the telematics unit 301 detects that the vehicle ignition has been turned off. Thereafter and/or in response to the detecting, at stage 312, the telematics unit 301 sends a Tracking Area Update (TAU) Request Message to the LTE MME 302. The TAU Request Message includes a Device Properties information element indicating that the mobile station (MS)—which in this case is the NAD of the telematics unit 301—is "configured for NAS [Non-Access Stratum] signaling low priority." The TAU Request Message may further include an MS Network Features Support information element indicating that the MS (or NAD) supports "extended periodic timer in this domain."

The LTE MME 302, upon receiving this TAU Request Message, inspects the information elements (which are indicative of entry into the DRx state by the NAD) at stage 313 and determines a T3412 timer value (and/or T3412 extended timer value, if supported) to provide to the NAD of the telematics unit 301. The LTE MME 302 then sends a TAU Accept Message at stage 314 with the T3412 timer value and/or the T3412 extended timer value to the NAD at stage 314, and the NAD updates its timer according to the received timer value at stage 315, and then sends a TAU Complete message back to the LTE MME 302 at stage 316.

In the case that both a T3412 timer value and a T3412 timer value are received by the NAD, the NAD utilizes the T3412 extended timer value. In the case that no values for T3412 or T3412 extended are provided by the LTE MME 302 with the TAU Accept Message, the NAD utilizes a previously received timer value from a previous attachment or update procedure (e.g., the most recently received value).

The NAD 301 operates in the DRx state according to a modified TAU procedure based on a T3412 or T3412 extended value received from the LTE MME 302 at stage 317. In an example, the default or normal value for the timer is 54 minutes, and the T3412 or T3412 extended values received by the NAD for DRx operation are longer than 54 minutes or, alternatively, indicate deactivation of the timer such that no periodic updates are performed. The NAD is thus able to perform less TAU-related processing and transmissions in the DRx state (and consume less power) relative to a normal state where the vehicle ignition is on. The NAD 301 is also able to perform less TAU-related processing and transmissions in the DRx state (and consume less power) relative to a conventional NAD in the DRx state.

The NAD remains in the DRx state until a condition is met for the NAD to transition to an off state (in which case the process shown in FIG. 3 goes through stage 321), or until the telematics unit 301 detects that the vehicle ignition is turned back on (in which case the process shown in FIG. 3 goes through stages 331, 332 and 333).

For transitioning to an off state, the NAD performs a detach procedure, including an indication that the NAD is powering down, with respect to the LTE MME 302 at stage 321.

For detection of a vehicle ignition-on condition, the NAD performs a TAU updating procedure triggered by the vehicle ignition-on condition, which includes sending a TAU Request message with the Device Properties information element indicating that the "MS is not configured for NAS signaling low priority" at stage 331 (which indicates to the LTE MME 302 that the NAD has exited the DRx state and normal or default timer value(s) should be invoked for mobility management update procedures). The LTE MME 302 then processes the TAU Request message and sends a TAU Accept message back to the NAD at stage 332 having a normal or default value for T3412. The NAD then updates its timer back to a default or normal value (e.g., according to the TAU Accept message), sends a TAU Complete message back to the LTE MME 302, and executes a default or normal periodic TAU procedure while the vehicle ignition remains on at stage 333.

Although FIG. 3 specifically relates to an LTE network and describes TAU updating procedures, it will be appreciated that the principles illustrated in FIG. 3 (and FIG. 2) may also be applied to other updating procedures, including but not limited to routing area updates and location area updates, as well as with respect to other networks, such as Wideband Code Division Multiple Access (WCDMA) or Universal Mobile Telecommunications System (UMTS) networks, as well.

Figure 4:
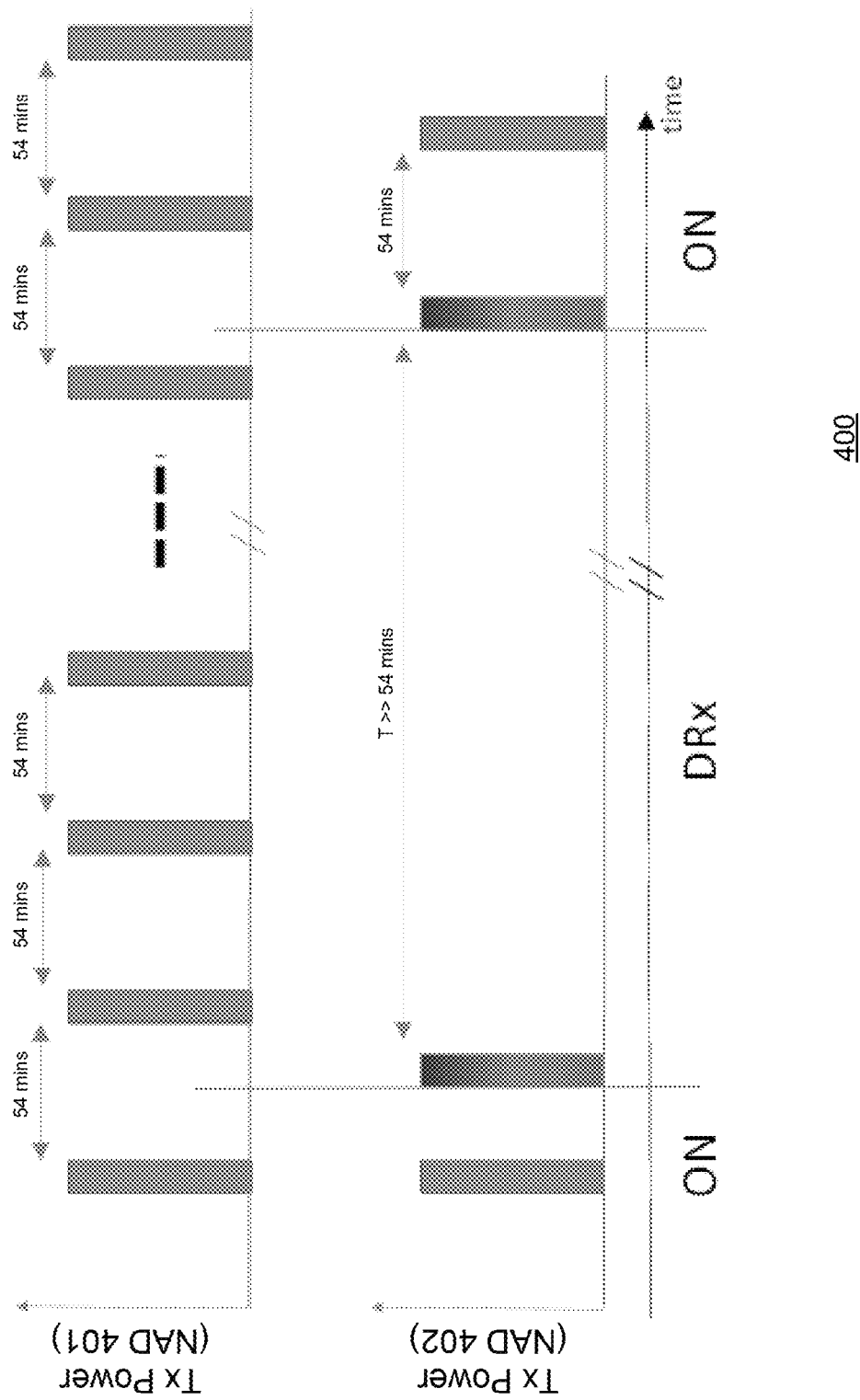
FIG. 4 is an exemplary plot illustrating frequency of DRx transmissions performed by a NAD according to an exemplary implementation of the invention relative to a conventional NAD.

FIG. 4 is an exemplary plot 400 illustrating advantages in power consumption achieved by an exemplary implementation of the invention. FIG. 4 compares, in an example, frequency of DRx transmissions for TAU updates performed by a NAD in the DRx state according to an exemplary implementation of the invention relative to frequency of DRx transmissions for TAU updates a conventional NAD in the DRx state. A plot of the transmission power consumed by a conventional NAD 401 is shown in the top portion of FIG. 4, with blocks of transmission power being consumed at regular intervals of 54 minutes for TAU updates regardless of whether the NAD 401 is the DRx state or not. In contrast, a plot of the transmission power consumed by an NAD 402 in an exemplary implementation of the invention is shown in the bottom portion of FIG. 4, with blocks of transmission power being consumed at regular intervals of 54 minutes for TAU updates only while the vehicle ignition and the NAD 402 are in an ON state. The bottom plot for NAD 402 shows that one TAU procedure is performed upon transition into the DRx state (i.e., to send updated Device Properties information and/or Features Support information and receive updated information for modifying a timer of the NAD 402), but while in the DRx state, the frequency for subsequent TAU procedures is greatly reduced (and in this case eliminated altogether). Upon transition of the vehicle ignition and the NAD 402 back into an ON state, a TAU procedure is performed to modify the timer of the NAD 402 back to the default or normal (non-DRx) periodic updating interval of 54 minutes.

Tables 1 and 2 below shows the reduction in the number of TAU procedures needed for different time periods spent by an NAD in the DRx state with respect to an exemplary implementation of the invention relative to a conventional NAD. Table 1 shows the number of TAU procedures performed by a conventional NAD for different periods of time spent in the DRx state. Table 2 shows the number of TAU procedures performed by an NAD in the DRx state according to an exemplary implementation of the invention for different periods of time and for different settings of a T3412 extended timer value for the NAD. Table 3 shows the relative power savings achieved by the NAD in the exemplary implementation of the invention compared to the conventional NAD for the different periods of time and the different settings of the T3412 extended timer.

TABLE 1

Number of DRx TAU Procedures for Conventional NAD

| | Time Period | | | |
|---|---|---|---|---|
| | 6 hours | 12 hours | 24 hours | 240 hours |
| Number of TAU Procedures | 6 | 13 | 26 | 266 |

TABLE 2

Number of DRx TAU Procedures for NAD in an Exemplary Implementation

| | Time Period | | | |
|---|---|---|---|---|
| | 6 hours | 12 hours | 24 hours | 240 hours |
| Number of TAU Procedures (T3412 ext. set to 5 hours) | 2 | 3 | 5 | 49 |
| Number of TAU Procedures (T3412 ext. set to 10 hours) | 1 | 2 | 2 | 25 |
| Number of TAU Procedures (T3412 ext. set to 24 hours) | 1 | 1 | 1 | 11 |
| Number of TAU Procedures (T3412 ext. set to 120 hours) | 1 | 1 | 1 | 3 |
| Number of TAU Procedures (T3412 ext. set to deactivated) | 1 | 1 | 1 | 1 |

TABLE 3

Relative Power Savings Achieved by NAD in an Exemplary Implementation

| | Time Period | | | |
|---|---|---|---|---|
| | 6 hours | 12 hours | 24 hours | 240 hours |
| Relative Power Savings (T3412 ext. set to 5 hours) | 66.7% | 76.9% | 80.8% | 81.6% |
| Relative Power Savings (T3412 ext. set to 10 hours) | 83.3% | 84.6% | 92.3% | 90.6% |
| Relative Power Savings (T3412 ext. set to 24 hours) | 83.3% | 92.3% | 96.2% | 95.9% |
| Relative Power Savings (T3412 ext. set to 120 hours) | 83.3% | 92.3% | 96.2% | 98.9% |
| Relative Power Savings (T3412 ext. set to deactivated) | 83.3% | 92.3% | 96.2% | 99.6% |

Figure 5:
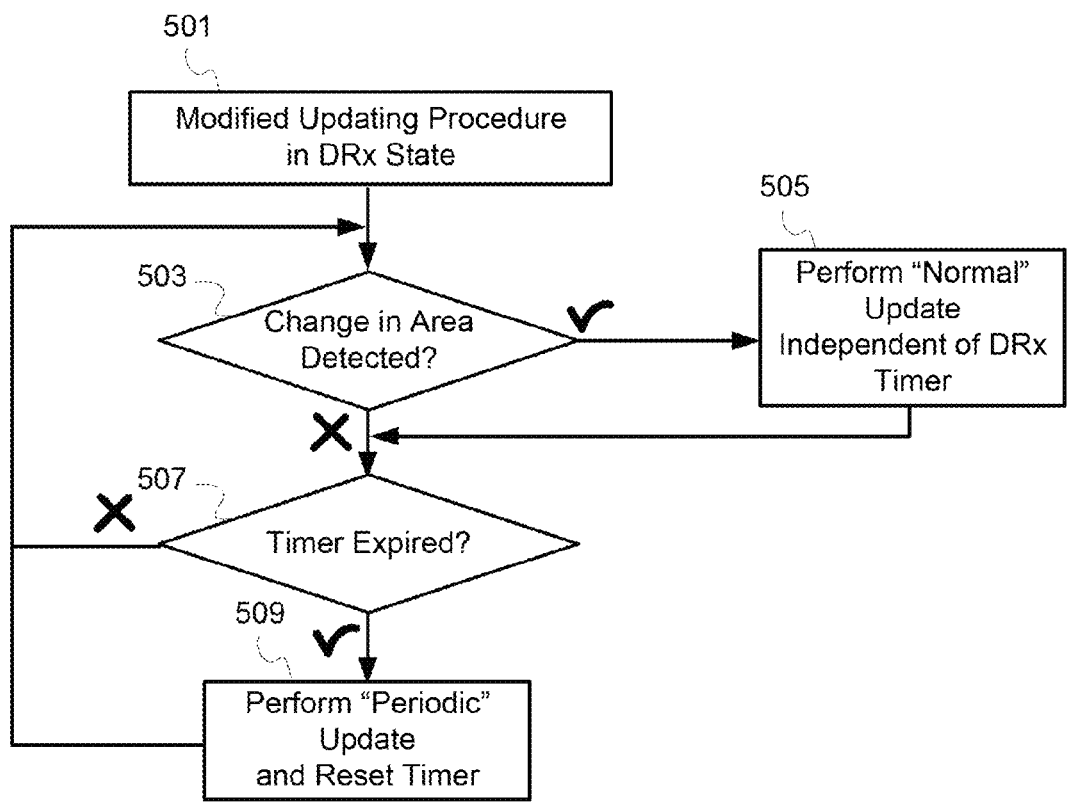
FIG. 5 is a flowchart illustrating a process for operation of an NAD in the DRx state in an exemplary implementation.

FIG. 5 is a flowchart 500 illustrating a process for carrying out the modified updating procedure (e.g., as discussed above with respect to stage 207 of FIG. 2) for an NAD in the DRx state that accounts for special circumstances where the vehicle corresponding to the NAD experiences changes with regard to, for example, location area, routing area, or tracking area while the NAD is in the DRx state (such as when the vehicle is being towed or ferried, or in situations where the vehicle is stationary at a boundary between one location/routing/tracking area versus another location/routing/tracking area and switches from one area to the other). In these situations, a "normal" update is performed that is independent from the "periodic" updates of the modified updating procedure which are triggered by the timer used for the "periodic" updates in the DRx state (e.g., the T3412 or T3412 extended timer).

Specifically, FIG. 5 illustrates that at stage 501, the NAD has adopted a modified updating procedure for the DRx state (e.g., as discussed above with respect to FIGS. 2-3). While in the DRx state and using this modified updating procedure, the NAD determines whether any change in area (such as a change in tracking area) occurs at stage 503 and whether a timer for periodic updating expires at stage 507. For affirmative detection of a change in area, a "normal" update is performed at stage 505 that is independent of the periodic updates and the timer (i.e., the timer is not reset). For affirmative determination that the timer has expired, a "periodic" update is performed at stage 509 that causes the timer to be reset. It will be appreciated that the NAD may break out of the DRx-related loop shown in FIG. 5 upon occurrence of the conditions discussed above with respect to FIGS. 2-3 (i.e., detection of vehicle ignition on by the telematics unit or the NAD transitioning to an off state).

It will thus be appreciated that the described systems and methods utilize signaling procedures between a NAD of a telematics unit of a telematics-equipped vehicle and a serving wireless network to coordinate the operation of the NAD with the serving wireless network, such that transmissions from the NAD to the serving wireless network while the NAD is in the DRx state are reduced or limited so as to avoid unnecessary consumption of power. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for reduction of discontinuous-receive (DRx) transmissions for a telematics device of a telematics-equipped vehicle, the system comprising:
   the telematics device, configured to determine whether vehicle ignition of the telematics-equipped vehicle is on or off, wherein the telematics device is configured to communicate with a Mobility Management Entity (MME) of a Long Term Evolution (LTE) telecommunications network to perform a Tracking Area Update (TAU) procedure, wherein, while the vehicle ignition is on, the telematics device is configured to periodically perform TAU procedures at a default interval, and wherein, based on the vehicle ignition being off, the telematics device is configured to trigger a reduced frequency for performing TAU procedures by sending a TAU Request Message to the MME, wherein the TAU Request Message includes an information element indicating that the telematics device is configured for Non-Access Stratum (NAS) signaling low priority and an information element indicating that the telematics device supports an extended periodic timer; and
   the MME, configured to receive the TAU Request Message, determine a timer value and/or extended timer value based on the TAU Request Message, and send a TAU Accept Message to the telematics device;
   wherein the telematics device is further configured to receive the TAU Accept Message, adjust a timer corresponding to an interval for performing TAU procedures based on the timer value and/or the extended timer value of the received TAU Accept Message, and to send a TAU Complete message to the MME.

2. The system according to claim 1, wherein adjusting the timer includes deactivation of the timer.

3. The system according to claim 1, wherein the telematics device is further configured to, in response to detecting that the vehicle ignition is turned on, transition from performing TAU procedures at the reduced frequency to periodically performing TAU procedures at the default interval.

4. The system according to claim 1, wherein the telematics device is further configured to, in response to determining that a network access device (NAD) is to be turned off, perform a detach procedure with respect to the MME.

5. The system according to claim 1, wherein the telematics device is further configured to determine a change in area has occurred and, in response to detection of the change in area, perform a TAU procedure independent of any periodic TAU procedure performed by the telematics device.

6. A non-transitory, processor-readable medium having processor-executable instructions stored thereon for reduction of discontinuous-receive (DRx) transmissions for a telematics device of a telematics-equipped vehicle, the processor-executable instructions, when executed by a processor, facilitating performance of the following steps:
   while a vehicle ignition of the telematics-equipped vehicle is on, communicating with a Mobility Management Entity (MME) of a Long Term Evolution (LTE) telecommunications network to periodically perform Tracking Area Update (TAU) procedures at a default interval;
   determining that the vehicle ignition of the telematics-equipped vehicle is off;
   while the vehicle ignition of the telematics-equipped vehicle is off, triggering a reduced frequency for performing TAU procedures by sending a TAU Request Message to the MME, wherein the TAU Request Message includes an information element indicating that the telematics device is configured for Non-Access Stratum (NAS) signaling low priority and an information element indicating that the telematics device supports an extended periodic timer;
   receiving a TAU Accept Message from the MME, wherein the TAU Accept Message comprises a timer value and/or extended timer value determined by the MME based on the TAU Request Message;
   adjusting a timer corresponding to an interval for performing TAU procedures based on the timer value and/or the extended timer value of the received TAU Accept Message; and
   sending a TAU Complete message to the MME.

7. The non-transitory, processor-readable medium of claim 6, wherein adjusting the timer includes deactivation of the timer.

8. The non-transitory, processor-readable medium of claim 6, wherein the processor-executable instructions, when executed by a processor, further facilitate performance of the following steps:
   detecting that the vehicle ignition is turned on; and
   in response to detecting that the vehicle ignition is turned on, transitioning from performing TAU procedures at the reduced frequency to periodically performing TAU procedures at the default interval.

9. The non-transitory, processor-readable medium of claim 6, wherein the processor-executable instructions, when executed by a processor, further facilitate performance of the following steps:
   determining a change in area has occurred;
   performing, in response to detection of the change in area, a TAU procedure independent of any periodic TAU procedure performed by the telematics device.

* * * * *